3,851,057
DEXTRAN DERIVATIVES FOR THE REDUCTION OF BLOOD LIPIDS

Fumio Kuzuya, Nagoya, Japan, assignor to Meito Sangyo Kabushiki Kaisha, Nagoya, Japan
No Drawing. Filed Sept. 22, 1972, Ser. No. 291,286
Claims priority, application Japan, Sept. 23, 1971, 46/73,795
Int. Cl. A61k 27/00
U.S. Cl. 424—180                                    7 Claims

ABSTRACT OF THE DISCLOSURE

An orally administered agent for the reduction of blood lipids, comprising diethylaminoethyl dextran having an intrinsic viscosity of 0.88 to 1.81 and a degree of substitution of 1.3–2.0 of its pharmaceutically acceptable acid salt and a pharmaceutical carrier, a process for producing said diethylaminoethyl dextran agents and the administration thereof.

---

This invention relates to an orally administered agent comprising as a pharmaceutically effective ingredient a dextran derivative having the excellent pharmacological action of markedly reducing lipids in the blood related to arteriosclerosis, such as serum cholesterol, serum β-lipoprotein or serum triglyceride, a method of producing such a pharmaceutically effective ingredient, and a method of administering said agent.

Attempts have previously been made to administer orally a basic polymer such as diethylaminoethyl cellulose or diethylaminoethyl Sephadex (a trademark of Pharmacia Fine Chemicals AB, Uppoola, Sweden, used for a cross-linked dextran) as an agent for inhibiting the absorption of cholesterol, but such a polymer still requires improvement in its effect and removal of its side effects.

It has now been found that diethylaminoethyl dextrans having an intrinsic viscosity of 0.88 to 1.81 and a degree of substitution of 1.3 to 2.0 are compounds that can be orally administered for prolonged periods of time with low toxicity and are excellent in reducing blood lipids.

Accordingly, it is an object of this invention to provide an orally administered agent comprising as a pharmaceutically effective ingredient diethylaminoethyl dextran having the above-specified intrinsic viscosity and degree of substitution, low toxicity, and the capability of reducing blood lipids, a method of administering said agent, and a method of producing said pharmaceutically effective ingredient.

Many other objects of this invention together with its advantages will become apparent from the following description.

It has previously been known to produce diethylaminoethyl dextran by reacting dextran with an acid salt of diethylaminoethyl halide (for example, hydrochloride) in an aqueous medium in the presence of an alkali metal hydroxide to etherify the —OH of dextran. But it has been totally unknown that diethylaminoethyl dextran having an intrinsic viscosity of 0.88 to 1.81 and a degree of substitution of 1.3 to 2.0 can be produced and that such diethylaminoethyl dextran exhibits in oral administration especially outstanding effects of reducing blood lipids and has low toxicity.

Chemistry and Industry, November 1959, pages 1490–1491 gives a description of the production of the diethylaminoethyl ether of dextran, and reports an example wherein diethylaminoethyl dextran was synthesized by reacting dextran having an intrinsic viscosity of 0.04–1.15 with about 0.57 to 0.97 mol, based on the dextran, of diethylaminoethylchloride hydrochloride in an aqueous medium in an amount 2–3.5 times the weight of the dextran, in the presence of 2.7 molar times the dextran of an alkali metal hydroxide, with the statement that such diethylaminoethyl dextran has an effect of coagulating plasma protein.

This report, however, is totally silent on the blood lipid reducing action of diethylaminoethyl dextran, and neither discloses nor suggests the diethylaminoethyl dextran having the above-specified intrinsic viscosity and degree of substitution, nor the combination of conditions required for producing it.

Nature, Vol. 215, July 1967, pages 415–416 describes the changes of blood sugar value and liver glycogen value with oral administration of dextran, Sephadex, diethylaminoethyl dextran and diethylaminoethyl Sephadex. It experimentally shows that diethylaminoethyl dextran is hydrolysed by an enzyme but diethylaminoethyl Sephadex is not, and that the diethylaminoethyl Sephadex has the effect of inhibiting cholesterol absorption. Thus, this report neither discloses nor suggests the blood lipid reducing action of diethylaminoethyl dextran or the intrinsic viscosity, degree of substitution, and conditions for production, of the diethylaminoethyl dextran referred to therein. This report only shows that the starting dextran had a molecular weight of $2 \times 10^6$, and neither discloses diethylaminoethyl dextran having the above-specified intrinsic viscosity and degree of substitution nor the combination of the conditions for producing it. Furthermore, it is quite silent on the blood lipid reducing action of such diethylaminoethyl dextran.

Giorn. Biochim. *14*, (Italy, 1965), describes the production of dextran derivatives at pages 88 to 98. Moreover, at pages 92 to 98 the production of diethylaminoethyl dextran and its physical and chemical properties are described. There is described an example wherein natural dextran was reacted with 0.47–2.16 mols, based on the dextran, of diethylaminoethyl chloride hydrochloride in an aqueous medium in an amount 15 times the weight of the dextran in the presence of an alkali metal hydroxide in an amount 5.4 molar times the amount of the dextran to produce diethylaminoethyl dextran having a degree of substitution of 0.55–0.96. This reference, however, is totally silent on the blood lipid reducing action of the diethylaminoethyl dextran and its pharmaceutical effect, and does not at all disclose diethylaminoethyl dextran or the combination of conditions for its production.

According to the present invention, dextran having an intrinsic viscosity of at least 0.88 is reacted with 2.3–10 mols, based on the dextran, of an acid salt of diethylaminoethyl halide in an aqueous medium in an amount of 4 to 8 times the amount of the dextran and in the presence of an alkali metal hydroxide in an amount of at least 2 mols based on the acid salt of diethylaminoethyl halide, thereby to form diethylaminoethyl dextran having an intrinsic viscosity of 0.88 to 1.81 and a degree of substitution of 1.3 (preferably 1.4) to 2.0.

Alternatively, the diethylaminoethyl dextran having an intrinsic viscosity of 0.88 to 1.81 and a degree of substitution of 1.3 to 2.0 is prepared by reacting dextran having an intrinsic viscosity of at least 0.88 (preferably 1.0) to 1.81 with 1.5–3.7 mols, based on the dextran, of diethylaminoethyl halide in dimethyl sulfoxide in an amount at least 30 times, (for example 30–50 times), the volume of the dextran, and in the presence of an alkali metal hydride such as lithium hydride, sodium hydride or potassium hydride in an amount at least equimolar to the diethylaminoethyl halide and in the absence of molecular oxygen and moisture, at a temperature of 10 to 100° C. (preferably 15 to 30° C.).

By the term "degree of substitution," as used herein, is meant the number of diethylaminoethyl groups per anhydrous glucose unit of dextran, which is calculated from N amount measured by the Micro-Kjeldahl method.

The "intrinsic viscosity" $[\eta]$ is defined as follows:

$$[\eta] = \lim_{c \to 0} \eta_{sp}/C.$$

wherein $$\eta_{sp} = (\eta - \eta_0)/\eta_0 = \eta/\eta_0 - 1$$

$\eta$ = the viscosity of the solution (1.0M saline solution, 25° C.)
$\eta_0$ = the viscosity of the solvent
C. = the concentration at g./100 ml.

The intrinsic viscosity of diethylaminoethyl dextran is measured as its hydrochloride salt, and the intrinsic viscosity of the starting dextran is measured in an aqueous solution at 25° C.

As the alkali metal hydroxide in the present invention, sodium hydroxide is most frequently used. If desired, potassium hydroxide and lithium hydroxide can also be used. As the acid salt of diethylaminoethyl halide, an acid salt of diethylaminoethyl chloride is usually employed, but if desired, acid salts of other halides such as bromide, iodide or fluoride can also be used. The acid salts that can be used are inorganic acid salts, and hydrochloride is most commonly used.

The source dextran used in the present invention can be prepared by any method so long as it has an intrinsic viscosity of at least 0.88. For example, natural dextran produced from sucrose utilizing *Leuconostoc mesenteroides* or *Leuconostoc dextranicum,* or its partially depolymerized product having an intrinsic viscosity of at least 0.88 is used. Usually, dextrans having an intrinsic viscosity of 1.0 to 1.81 are utilized.

In the first-mentioned method of the present invention, the amounts of the alkali metal hydroxide, the aqueous medium and the acid salt of diethylaminoethyl halide should be specifically controlled in order to produce diethylaminoethyl dextran having the desired properties.

In other words, dextran having an intrinsic viscosity of at least 0.88 is reacted with an acid salt of diethylaminoethyl haldie in an amount of 2.3 to 10 mols, preferably 3.5 to 10 mols, based on the dextran in an aqueous medium in an amount of 4 to 8 times the weight of the dextran in the presence of an alkali metal hydroxide in an amount of at least 2 mols based on the acid salt of diethylaminoethyl halide. These quantitative requirements are essential for obtaining the diethylaminoethyl dextran in accordance with this invention. For example, if the amount of the alkali metal hydroxide is less than 2 mols based on the acid salt of diethylamino halide, the final product of the present invention is difficult to obtain even if the reaction temperature and time are controlled in various ways. If the amount of the acid salt of diethylaminoethyl halide is less than 2.3 mols, a product of the desired degree of substitution is difficult to prepare, and if it is more than 10 mols, the product is likewise difficult to obtain. When the amount of the aqueous medium is less than the above-specified range, the reaction becomes non-uniform, and undesirable side-reactions such as decomposition, oxidation or coloring of the dextran tend to occur. If it is too large, the product obtained has a low degree of substitution, and does not possess the hitherto unkown excellent pharmacological effect, that is, low toxicity and excellent blood lipid reducing action.

The reaction is carried out by adding the acid salt of diethylaminoethyl halide and alkali metal hydroxide as such or in the form of an aqueous solution to an aqueous solution of dextran at a low temperature, usually below room temperature, preferably below about 15° C. The reaction proceeds even at room temperature, and temperatures of about 20 to 100° C. can be employed, but it is desirable to employ temperatures of 40 to 75° C. The acid salt of diethylaminoethyl halide may be added all at once in the specified amount, but good results are often obtained by adding it in prtion. If desired, the reaction product is separated from the reaction mixture and again added to the aqueous medium. Then, the reaction is again initiated by addition of residual reaction components.

A product having the desired intrinsic viscosity and degree of substitution can usually be obtained with a reaction time of about 1.5 to 5 hours. If desired, the reaction time may either be shortened or prolonged.

According to the second-mentioned method, the reaction is performed in the absence of molecular oxygen and moisture, for example in an atmosphere of nitrogen gas. The alkali metal hydride should be used in an amount at least equimolar to the diethylaminoethyl halide, preferably up to about 5 mols. If the amount is less than the equimolar, the desired product is difficult to obtain. Further, the amount of diethylaminoethyl halide should be 1.5 to 3.7 mols based on the dextran. If the amount is less than this specified range, products of the desired degree of substitution are difficult to prepare. If the amount is larger than the specified range, the desired product is not obtained. When the amount of the dimethyl sulfoxide medium is less than 30 times the volume of the dextran, the reaction becomes non-uniform, and the desired product is difficult to obtain. The reaction time is usually from 2 to 10 hours.

The specific combination of conditions described above is critical, and the reaction temperature and time, although having some influence on the preparation of compounds having the specified intrinsic viscosity and degree of substitution, are of secondary importance. If the specific combination of the conditions is not met, it is impossible to obtain the product of the present invention having low toxicity and excellent blood lipid reducing action, however the reaction temperature and time may be controlled. In any case, the reaction according to the present invention is performed under the specific combination of the conditions until diethylaminoethyl dextran having an intrinsic viscosity of 0.88 to 1.81 and a degree of substitution of 1.3 to 2.0 is obtained.

There is no particular restriction on the order of addition of the reaction components and reaction assistants, and the order of addition described above is a mere illustration. If desired, the resulting product can be converted to a pharmaceutically acceptable acid salt. The conversion can be effected by contacting the separated reaction product with an acid, for example, a mineral acid such as hydrochloric acid, sulfuric acid or nitric acid or an organic acid such as acetic acid, oxalic acid, latic acid, malonic acid, citric acid, or tartaric acid, or this may be effected within the reaction mixture after the reaction.

The reaction product formed can be separated either as a free base or as an acid salt. According to the first-mentioned method, the reaction product can be separated by adding a water-miscible poor solvent such as acetone, methyl ethyl ketone, isopropyl alcohol, preferably acetone, to precipitate the prouct. According to the second-mentioned method, such a poor solvent as water, acetone or methyl ethyl ketone. The amount of the solvent is not critical, and need only be sufficient for precipitation of the intended reaction product. Usually, the amount is about 1 to 5 times the volume of the reaction mixture.

Where it is desired to obtain diethylaminoethyl dextran in a free base form from the reaction mixture, acetone in the desired amount is added to the reaction mixture. When it is desired to obtain it in the form of an acid salt, for example hydrochloride, the reaction mixture is cooled either positively or spontaneously, and then contacted with hydrochloric acid, after which acetone in the desired amount is added to precipitate the product in the form of hydrochloride.

The resulting final product, if desired, may be purified by re-precipitation, dialysis or other known purification means, and there can be obtained the desired diethylaminoethyl dextran or its acid salt in a yield of more than 90%.

The diethylaminoethyl dextran having an intrinsic viscosity of 0.88 to 1.81 and a degree of substitution of 1.3 to 2.0 and pharmaceutically acceptable acid salts thereof produced by the method of the present invention and their low toxicity and excellent blood lipid reducing action have not been described in the literature as far as the inventors of the present invention know. The advantages of this invention will become apparent from the results of experiments shown below in Tables 1 to 3.

The invention will be specifically illustrated by the following Examples together with the description of the toxicity and pharmacological action of the diethylaminoethyl dextran in accordance with the invention.

EXAMPLE 1

10 g. of natural dextran having an intrinsic viscosity of 1.70 was dissolved in 20 ml. of water, and with stirring at below 10° C., an aqueous solution of 8.3 g. of sodium hydroxide in 5 ml. of water and an aqueous solution of 17.8 g. of diethylaminoethyl chloride hydrochloride in 5 ml. of water were added gradually. The mixture was reacted for 15 minutes at 60° C. with stirring, and then cooled to below 10° C. This procedure was repeated five times, and when the sodium hydroxide and diethylaminoethyl chloride hydrochloride had been completely added, the reaction solution was maintained at 70° C. The reaction was continued for an additional 1.5 hours with stirring. Sodium chloride precipitated in the reaction solution was removed, and then with the addition of acetone, the product was precipitated. The precipitate was dissolved in a suitable amount of water, and acetone was added to the aqueous solution obtained; this procedure was repeated twice. The aqueous solution was then adjusted to pH 4.5 with hydrochloric acid while cooling, and by the addition of 3 times its volume of acetone, a precipitate was formed. The precipitate was dissolved in ethanol, and if desired, the impurities were removed by filtration, after which the filtrate was added to ether to form a precipitate. The precipitate was recovered by filtration and dried at reduced pressure to form diethylaminoethyl dextran hydrochloride as white powder.

Amount yielded: 24 g. (yield 90%)
Degree of substitution: 2.0 (nitrogen content 6.44%, chlorine content 16.4%)
Intrinsic viscosity: 1.37.

EXAMPLE 2

10 g. of natural dextran having an intrinsic viscosity of 1.70 was dissolved in 30 ml. of water, and an aqueous solution of 41 g. of sodium hydroxide in 25 ml. of water and an aqueous solution of 88 g. of diethylaminoethyl chloride hydrochloride in 25 ml. of water were added in six portions in the same manner as in Example 1. Finally, the mixture was reacted for one hour at 70° C. with stirring. After the reaction, sodium chloride precipitated was removed, and the reaction product was neutralized with sulfuric acid, followed by dialysis using running tap water. After the dialysis, the pH of the dialysate was adjusted to 4.5 with sulfuric acid, and a syrupy product was prepared by concentration at reduced pressure. The syrup was dissolved in methanol and powdered using ether. There was obtained diethylaminoethyl dextran sulfate as white powder.

Amount yielded: 29.9 g. (yield 94%)
Degree of substitution: 1.80 (nitrogen content 4.88%, sulfur content 11.15%)
Intrinsic viscosity (measured as hydrochloride): 1.38.

EXAMPLE 3

10 g. of dextran having an intrinsic viscosity of 1.15 was dissolved in 15 ml. of water, and an aqueous solution of 22.5 g. of sodium hydroxide in 12 ml. of water and an aqueous solution of 48 g. of diethylaminoethyl chloride hydrochloride in 12 ml. of water were added in four portions in the same way as in Example 1. Finally, the mixtures was reacted for 1 hour at 70° C. with stirring. The reaction product was treated in the same way as in Example 1 to form diethylaminoethyl dextran hydrochloride as white powder.

Amount yielded: 22.3 g. (yield 95%)
Degree of substitution: 1.60 (nitrogen content 5.89%, chlorine content 14.9%)
Intrinsic viscosity: 0.98.

EXAMPLE 4

10 g. of dextran having an intrinsic viscosity of 1.70 was dissolved in 20 ml. of water, and an aqueous solution of 34.7 g. of sodium hydroxide in 25 ml. of water and an aqueous solution of 75 g. of diethylaminoethyl chloride hydrochloride in 25 ml. of water were added in five portions in the same way as in Example 1. Finally, the mixture was reacted for 1 hour at 70° C. with stirring. After the reaction, the reaction product was separated with the addition of acetone and purified in the same way as in Example 1. The resulting precipitate was dissolved in methanol, and powdered using isopropyl alcohol to form diethylaminoethyl dextran hydrochloride as white powder.

Amount yielded: 21.2 g. (yield 90%)
Degree of substitution: 1.60 (nitrogen content 5.89%, chlorine content 14.9%)
Intrinsic viscosity: 1.40.

EXAMPLE 5

10 g. of dextran having an intrinsic viscosity of 1.51 was dissolved in 20 ml. of water, and an aqueous solution of 17 g. of sodium hydroxide in 10 ml. of water and an aqueous solution of 36.4 g. of diethylaminoethyl chloride hydrochloride in 10 ml. of water were added in four portions in the same way as in Example 1. The mixture was reacted for 1 hour at 70° C. with stirring. After the reaction, the reaction product was treated in the same way as in Example 1 to form diethylaminoethyl hydrochloride as white powder.

Amount yielded: 19.1 g. (yield 91%)
Degree of substitution: 1.30 (nitrogen content 5.35%, chlorine content 13.6%)
Intrinsic viscosity: 1.40.

EXAMPLE 6

10 g. of dextran having an intrinsic viscosity of 1.30 was dissolved in 400 ml. of dimethyl sulfoxide. Separately, 95 ml. of dimethyl sulfoxide was added to 4.4 g. of sodium hydride in an atmosphere of nitrogen to prepare a solution of sodium hydrate in dimethyl sulfoxide. This solution was added to the above prepared dextran solution, and the mixture was stirred for 3 hours at 25° C. Then, 24.5 g. of diethylaminoethyl chloride was added, and the mixture was stirred further for 5 hours at 25° C. The reaction mixture was poured into ice water. The reaction product precipitated was recovered by filtration, and dissolved in dilute hydrochloric acid. Acetone was then added, and the precipitate formed was dissolved with water. Reprecipitation with acetone yielded diethylaminoethyl dextran hydrochloride as white powder.

Amount yielded: 21.6 g. (yield 92.0%)
Degree of substitution: 1.60 (nitrogen content 5.8%; chlorine content 14.9%)
Intrinsic viscosity: 1.50.

COMPARATIVE EXAMPLE 1

The procedure of Example 1 was repeated except that dextran having an intrinsic viscosity of 0.40 was used. There was obtained diethylaminoethyl dextran hydrochloride as white powder.

Amount yielded: 19.9 g. (yield 85%)
Degree of substitution: 1.60 (nitrogen content 5.89%, chlorine content 14.9%)
Intrinsic viscosity: 0.39.

COMPARATIVE EXAMPLE 2

The procedure of Example 3 was repeated except that dextran having an intrinsic viscosity of 0.08 was employed. The reaction product was separated and purified in the same way as in Example 2 except that hydrochloric acid was used instead of sulfuric acid. There was obtained diethylaminoethyl dextran hydrochloride as white powder.

Amount yielded: 19.7 g. (yield 84%)
Degree of substitution: 1.60 (nitrogen content 5.89%, chlorine content 15.0%)
Intrinsic viscosity: 0.08.

COMPARATIVE EXAMPLE 3

The procedure of Example 1 was repeated except that dextran having an intrinsic viscosity of 1.81 was used and the amounts of sodium hydroxide and diethylaminoethyl chloride were changed respectively to 57 g. and 123 g. There was obtained diethylaminoethyl dextran hydrochloride as white powder.

Amount yielded: 24.9 g. (yield 90%)
Degree of substitution: 2.1 (nitrogen content 6.57%, chlorine content 16.8%)
Intrinsic viscosity: 1.40.

COMPARATIVE EXAMPLE 4

10 g. of dextran having an intrinsic viscosity of 1.43 was dissolved in 20 ml. of water, and a solution of 7.4 g. of sodium hydroxide in 7 ml. of water and a solution of 18.2 g. of diethylaminoethyl chloride hydrochloride in 7 ml. of water were added to the dextran solution at below 10° C. The mixture was stirred for one hour at 70° C. to perform the reaction. After the reaction, the reaction product was treated in the same way as in Example 1 to form diethylaminoethyl dextran hydrochloride as white powder.

Amount yielded: 15.5 g. (yield 93%)
Degree of substitution: 0.8 (nitrogen content 4.12%, chlorine content 10.5%)
Intrinsic viscosity: 1.40.

The toxicity and the blood lipid reducing effect of the compounds obtained by the method of this invention will be shown below.

Test I

A Wistar male rat having a body weight of about 105 g. was fed with a mixture of a hypercholesterolemic diet (10 g./day) and diethylaminoethyl dextran hydrochloride (50 or 100 mg./100 g./day), and kept for 14 days. Then, the serum cholesterol value, serum $\beta$-lipoprotein value and serum triglyceride value of the rat were measured, and shown in Table 1. Table 1 also shows the results obtained with a control rat which was fed only a hypercholesterolemic diet (10 g./day) and comparative rats which were fed with a mixture of a hypercholesterolemic diet and the diethylaminoethyl dextrane hydrochloride obtained in Comparative Examples 1 and 2 which were outside the scope of the present invention.

The serum cholesterol value was measured by a modification of the Zak method. The serum $\beta$-lipoprotein value was measured by the Kuzuya modified version of the Walton-Scott method. The serum triglyceride value was measured by the Triglyceride-test-Wako. The same measurement methods were used hereinafter.

TABLE 1

| Case No. | Diet | Diethylaminoethyl dextran hydrochloride Intrinsic viscosity | Diethylaminoethyl dextran hydrochloride Amount (mg./100 g.) | Number of rats | | Body weight Before administration | Body weight 2 weeks after administration | Serum cholesterol (mg./dl.) | Serum $\beta$-lipoprotein (mg./dl.) | Serum triglyceride (mg./dl.) |
|---|---|---|---|---|---|---|---|---|---|---|
| 1 | Hypercholesterolemic diet (10 g./day) plus diethyl aminoethyl dextran hydrochloride. | 140 (product of example 4). | 50 | 10 | Average standard deviation. | 102 ±54 | 144 ±7.8 | [1] 218 ±55.3 | [1] 436 ±105.8 | 237 ±46.5 |
| 2 | | 0.98 (product of example 3). | 50 | 10 | do | 101 ±5.9 | 143 ±8.3 | [1] 231 ±68.2 | [1] 469 ±125.2 | 243 ±47.5 |
| 3 | | 0.39 (product of comparative example 1). | 50 | 10 | do | 101 ±4.9 | 147 ±7.2 | [1] 372 ±110.5 | [1] 609 ±148.5 | 262 >55.3 |
| 4 | | 0.08 (product of comparative example 2). | 50 | 10 | do | 100 ±5.8 | 140 ±8.5 | [1] 415 ±121.3 | [1] 654 ±153.4 | 265 ±57.3 |
| 5 | (Control) hypercholesterolemic diet (10 g./day). | | | 10 | do | 101 ±4.5 | 144 ±9.0 | 532 ±105.4 | 909 ±224.3 | 282 ±52.6 |

[1] Ts>t (5%) shows a significant difference in 5% risk as compared with the control (fed only with the hypercholesterolemic diet), ts>t (5%) Significant difference, ts<t (5%) No significant difference.

The composition of the hypercholesterolemic diet used above was as follows:

| | |
|---|---|
| Casein | percent 26.3 |
| Sugar | percent 61.2 |
| Mixed salt | percent 3.6 |
| Vitamin A | U./kg 25000 |
| Cholesterol | percent 1.0 |
| Hydrogenated coconut oil | percent 8.5 |
| Vitamin mixture | percent 0.34 |
| Vitamin D | U./kg 2500 |

The results shown in Table 1 demonstrate that the effects of reducing serum cholesterol and serum $\beta$-lipoprotein which were obtained by the diethyalminoethyl dextran hydrochloride having a degree of substitution of 1.6 and prepared in Cases Nos. 1 and 2 (having the intrinsic viscosity specified in the present invention) and Cases Nos. 3 and 4 (having the intrinsic viscosity outside the scope of the present invention) increase with increasing molecular weight; that these effects are especially remarkable with the diethylaminoethyl dextran hydrochloride having the intrinsic viscosity specified in the present invention, for example 0.98 and 1.40 (Cases Nos. 1 and 2), showing 50 to 60% reduction in serum cholesterol and serum $\beta$-lipoprotein as compared with the control; and that these effects shown by Cases 1 and 2 are far superior to those obtained with Cases 3 and 4.

In a group of rats administered with 50 mg./kg. of diethylaminoethyl dextran hydrochloride, the reduction of serum triglyceride does not differ significantly with the diethylaminoethyl dextran hydrochloride used. But as shown in Table 3, in the administration of 100 mg./100 g./day of diethylaminoethyl dextran hydrochlorides having a degree of substitution of 1.6 and an intrinsic viscosity of 0.98 and 1.42, the serum triglyceridide values obtained are about 35–40% lower than that of the control, showing a clearly significant difference. Furthermore, as shown in Table 3 below, the serum cholesterol and serum $\beta$-lipoprotein values in the case of a dose of 100 mg./100 g./day are clearly significantly different from those of the control and also from those in the case of a dose of 50 mg./100 g./day.

Test II

The same test as in Test II was performed using diethylaminoethyl dextran hydrochlorides having an intrinsic viscosity of 1.40 and a degree of substitution in (Case Nos.

7 and 8) and outside (Case Nos. 6 and 9) of the present invention. The results are shown in Table 2 below.

TABLE 2

| Case No. | Diet | Diethylaminoethyl dextran hydrochloride | | Number of rats | Body weight | | Serum cholesterol (mg./dl.) | Serum protein β-lipo- (mg./dl.) | Serum triglyceride (mg./dl.) |
|---|---|---|---|---|---|---|---|---|---|
| | | Intrinsic viscosity | Amount (mg./100 g.) | | Before administration | 2 weeks after administration | | | |
| 6 | Hypercholesterolemic diet (10 g./day) plus diethylaminoethyl dextran hydrochloride. | 2.1 (product of comparative example 3). | 50 | 10 Average standard deviation. | 102 ±5.6 | [1] 144 ±9.2 | [1] 283 ±70.6 | [1] 571 ±150.5 | 273 ±77.1 |
| 7 | | 1.6 (product of example 4). | 50 | 10 ..do.. | 107 ±4.6 | 155 ±7.1 | 198 ±55.0 | [1] 403 ±143.2 | 244 ±60.2 |
| 8 | | 1.3 (product of example 5). | 50 | 10 ..do.. | 104 ±4.9 | 153 ±9.8 | [1] 250 ±76.7 | [1] 512 ±154.7 | 261 ±110.6 |
| 9 | | 0.8 (product of comparative example 4). | 50 | 10 ..do.. | 105 ±5.2 | 152 ±8.2 | 398 ±65.2 | 690 ±125.4 | 276 ±70.3 |
| 10 | (Control) hypercholesterolemic diet (10 g./day). | | | 10 ..do.. | 106 ±5.7 | 157 ±10.5 | 496 ±97.1 | 895 ±225.1 | 290 ±59.9 |

[1] Ts>t (5%) as compared with the control.

The results shown in Table 2 demonstrate that when the degree of substitution of the dextran derivative is less than the lower limit (1.3) specified in the present invention with the intrinsic viscosity kept constant, there is no remarkable effect of reducing the lipids, but when it is within the range specified in the present invention, the dextran derivatives markedly reduce the serum cholesterol and serum β-lipoprotein. When the degree of substitution exceeds the upper limit specified in the present invention (Case No. 6), a decrease in body weight is observed as compared with the control rat, giving rise to a risk of side effects.

Test III

The same test was performed as in Test I using the diethylaminoethyl dextran hydrochloride having the intrinsic viscosity and degree of substitution specified in the present invention in varying doses. The results obtained are shown in Table 3 below.

TABLE 3

| Case No. | Diet | Diethylaminoethyl dextran hydrochloride | | Number of rats | Body weight | | Serum cholesterol (mg./dl.) | Serum β-lipoprotein (mg./dl.) | Serum triglyceride (mg./dl.) |
|---|---|---|---|---|---|---|---|---|---|
| | | Intrinsic viscosity | Amount (mg./100 g.) | | Before administration | 2 weeks after administration | | | |
| 11 | Hypercholesterolemic diet (10 g./day) + diethylaminoethyl dextran hydrochloride. | 1.40 (product of example 4). | 50 | 10 Average standard deviation. | 102 ±5.8 | 155 ±8.0 | 166 [1] ±49.0 | 320 [1] ±82.5 | 292 ±38.4 |
| 12 | | | 100 | 10 ..do.. | 104 ±4.5 | 147 ±7.2 | 116 [2][1] ±41.8 | 238 [2][1] ±75.0 | 161 [1] ±35.2 |
| 13 | | 0.98 (product of example 3). | 50 | 10 ..do.. | 103 ±5.0 | 143 ±8.2 | 175 [1] ±50.5 | 348 [1] ±77.1 | 234 ±39.8 |
| 14 | | | 100 | 10 ..do.. | 101 ±4.8 | 144 ±7.8 | 129 [2][1] ±43.3 | 254 [2][1] ±88.5 | 172 ±34.5 |
| 15 | (Control) hypercholesterolemic diet (10 g./day). | | | 10 ..do.. | 102 ±4.3 | 143 ±8.2 | 387 ±95.3 | 662 ±212.2 | 269 ±59.9 |

[1] Ts>t (5%) as compared with the control.
[2] Ts>t (5%) as compared with a 50 mg./kg. dose of diethylaminoethyl dextran hydrochloride.

The diethylaminoethyl dextran having an intrinsic viscosity of 0.88 to 1.81, preferably 0.98 to 1.81 and more preferably 1.37 to 1.81 and a degree of substitution of 1.3 to 2.0, preferably 1.4 to 2.0 and its pharmaceutically acceptable salts can be used in any desired formulation that can be orally administered, such as a powder, granule, capsule, tablet, coated tablet, syrup or solution. It has low toxicity, and can be administered continuously for prolonged periods of time. It is useful for the prevention and treatment of various diseases caused by high lipids content in the blood. It may be administered together with other medicines.

The final product obtained by the method of this invention can be formulated into a norally administered agent of a desired formulation mentioned above together with a pharmaceutical carrier such as liquid of solid diluents or adjuvants. Examples of the vehicle include lactose, sucrose, starch, dextrin, glucose, mannitol, calcium carbonate, kaolin, or calcium phosphate. There can be used a binder such as starch, gum arabic, gelatin, tragacanth gum, polyvinylpyrrolidone or methyl cellulose.

As a disintegrating agent, there can be used starch, sodium hydrogen carbonate, calcium citrate or, agar powders, etc. If desired, there can be used a flavoring agent.

According to the present invention, there can be provided an orally administered agent composed of diethylaminoethyl dextran having an intrinsic viscosity of 0.88 to 1.81 and a degree of substitution of 1.3 to 2.0 or its pharmaceutically acceptable acid salt and a pharmaceutical carrier. Usually, the dose is about 2–5 g./day/50 kg. of body weight.

The pharmaceutically effective ingredient used in the present invention can be orally administered together with other known medicines. Examples of the preferred known medicines are cholestorol excretion promoting agents such as phenyl propanol or its derivatives, unsaturated fatty acid derivatives (for example, ethyl linolate, linolic amide, or other linolic acid derivatives) protein anabolic sterolids (for example, oxymetholone, methandrostenolone, oxandrolone); female hormones (for example, desoxyestrone): cholesterol synthesis inhibitors such as nicotinic acid derivatives (for example, inositol nicotinate, dl-α-tocopherol nicotinate); and vitamins such as vitamin $B_6$ or E.

EXAMPLE 6

Formulation of medical composition (tablets):

Ingredients: Amount per tablet (mg.)
Diethylaminoethyl dextran hydrochloride (Example 1) _____ 250
Lactose _____ 140
Polyvinylpyrrolidone _____ 40
Talc _____ 50
Calcium citrate _____ 20

Diethylaminoethyl dextran hydrochloride and lactose were mixed, and passed through a U.S. standard screen of 60 mesh. The mixture was then wetted with alcoholic polyvinylpyrrolidone, and passed through a screen of 12 mesh. Thereafter the mixture was granulated and dried at 60° C. The dried granules were given a uniform size by sieving through a 16-mesh screen, and talc and calcium citrate were added, followed by forming into a single tablet having a weight of 500 mg.

EXAMPLE 7

Formation of powder:

| Ingredients: | Amount (g.) |
|---|---|
| Diethylaminoethyl dextran hydrochloride (Example 2) | 250 |
| Methyl cellulose | 150 |
| Cornstarch | 80 |
| Polyvinylpyrrolidone | 20 |
| Flavoring agent | 20 |

Methyl cellulose, a flavoring agent, and cornstarch were mixed and passed through a 60-mesh screen. The mixture was wetted with alcoholic polyvinylpyrrolidone, and the wetted mass was granulated with a 0.7-mm. diameter stainless steel screen.

EXAMPLE 8

Formulation of capsules:

| Ingredients: | Amount per capsule (mg.) |
|---|---|
| Diethylaminoethyl dextran hydrochloride (Example 3) | 250 |
| Lactose | 250 |

Diethylaminoethyl dextran hydrochloride and lactose were mixed, and passed through a 60-mesh screen. Then the powder of predetermined amount was filled into a capsule.

EXAMPLE 9

| Ingredients: | Amount (g.) |
|---|---|
| Dimethylaminoethyl dextran hydrochloride (Example 4) | 5 |
| Sucrose | 85 |
| Flavoring agent | 1 |
| Purified Water, U.S.P., q.s. 100.0 ml. | |

Five (5) g. of the diethylaminoethyl dextran hydrochloride was dissolved in 45 ml. of purified water, and heated to 50° C. To the solution 85 g. of sucrose and 1 g. of flavoring agent were added and dissolved, after which it was filtered and cooled. Thereafter the amount of the syrup was increased to 100 ml., using the purified water.

EXAMPLE 10

Formulation of solution:

| Ingredients: | Amount (g.) |
|---|---|
| Diethylaminoethyl dextran hydrochloride (Example 4) | 10.000 |
| Sodium saccharin | 0.025 |
| Flavoring agent | 0.010 |
| Purified Water, U.S.P., q.s. 100 ml. | |

Diethylaminoethyl dextran hydrochloride and sodium saccharin were dissolved in 70 ml. of warm, purified water, and the flavoring agent was added, followed by thorough stirring. After cooling, the amount of the solution was adjusted to be 100 ml. with the purified water.

EXAMPLE 11

Formulation of granules:

| Ingredients: | Amount (g.) |
|---|---|
| Diethylaminoethyl dextran hydrochloride (Example 5) | 250 |
| Lactose | 150 |
| Potato starch | 84 |
| Polyvinylpyrrolidone | 16 |

Diethylaminoethyl dextran hydrochloride, lactose, and potato starch were mixed, and sieved through a 60-mesh screen. The mixture was wetted with alcoholic polyvinylpyrrolidone, and the wetted mass was treated using a granulation with a 0.7-mm. diameter stainless steel screen.

What is claimed is:

1. An orally administered agent for the reduction of blood lipids, comprising diethylaminoethyl dextran having an intrinsic viscosity of 0.88 to 1.81 and a degree of substitution of 1.3–2.0 or its pharmaceutically acceptable acid salt, and a pharmaceutical carrier.

2. The agent of claim 1 wherein the diethylaminoethyl dextran has an intrinsic viscosity of 0.98 to 1.81 and a degree of substitution of 1.4–2.0.

3. The agent of claim 2 wherein the diethylaminoethyl dextran has an intrinsic viscosity of 1.37 to 1.81.

4. A method of treating hyperlipemia which comprises orally administering diethylaminoethyl dextran having an intrinsic viscosity of 0.88 to 1.81 and a degree of substitution of 1.3 to 2.0 or its pharmaceutically acceptable acid salt either alone or in combination with a pharmaceutical carrier.

5. The method of claim 4, wherein said diethylaminoethyl dextran has an intrinsic viscosity of 0.98 to 1.81 and a degree of substitution of 1.4 to 2.0.

6. The method of claim 5, wherein said diethylaminoethyl dextran has an intrinsic viscosity of 1.37 to 1.81 and a degree of substitution of 1.4 to 2.0.

7. The method of claim 4, wherein the dose of said dextran is 2 to 5 g./day/50/kg. of body weight.

References Cited

UNITED STATES PATENTS

| 3,148,114 | 9/1964 | Fahrenbach et al. | 424—195 |
| 3,511,910 | 5/1970 | Halleck | 424—180 |

HENRY A. FRENCH, Primary Examiner

U.S. Cl. X.R.

260—209